Feb. 5, 1957 F. F. VACANTI, JR 2,780,215
FOLDING COOKING STOVE
Filed Jan. 15, 1953 3 Sheets-Sheet 1
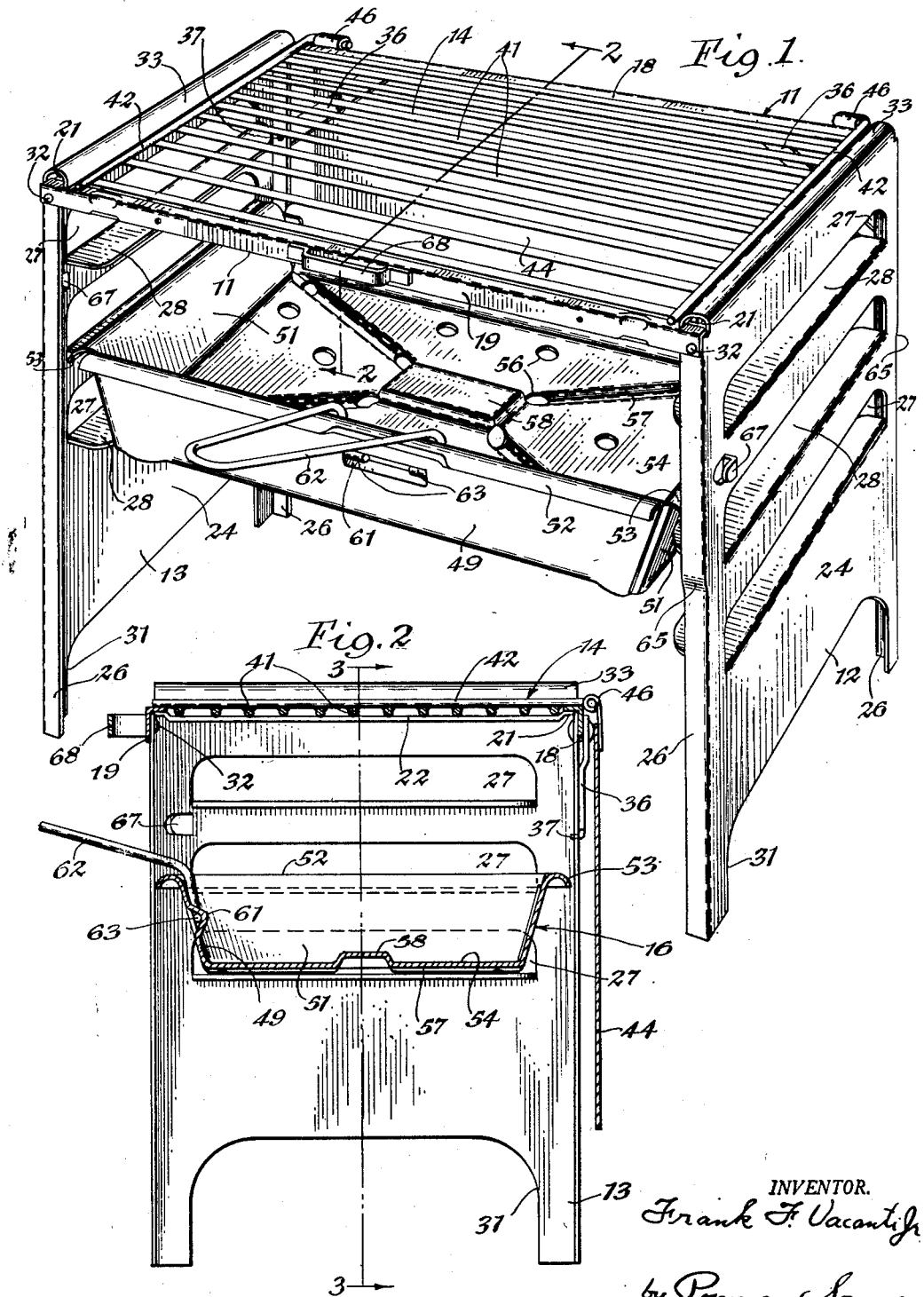
INVENTOR.
Frank F. Vacanti Jr.
by Popp and Sommer
ATTORNEYS

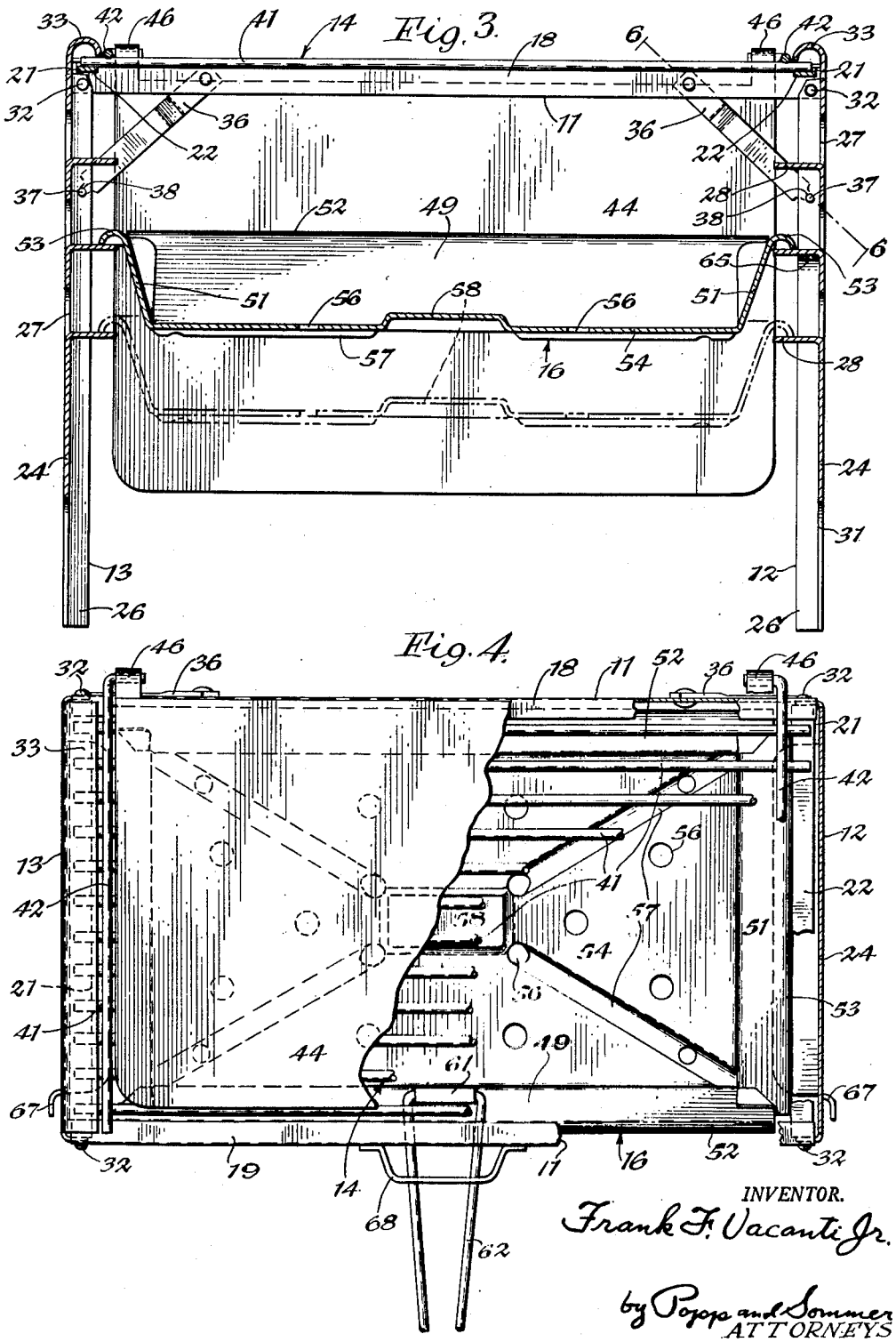

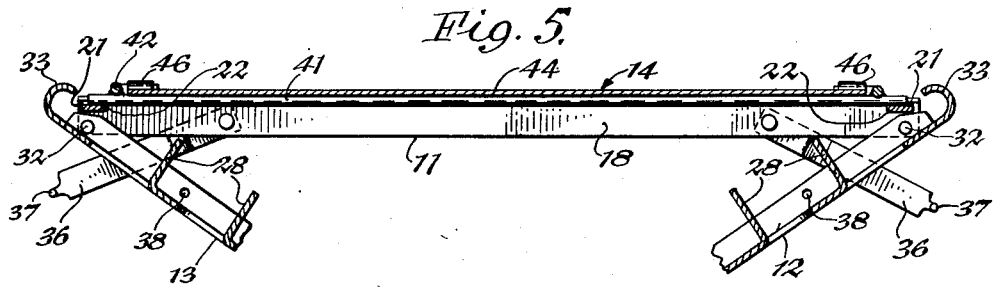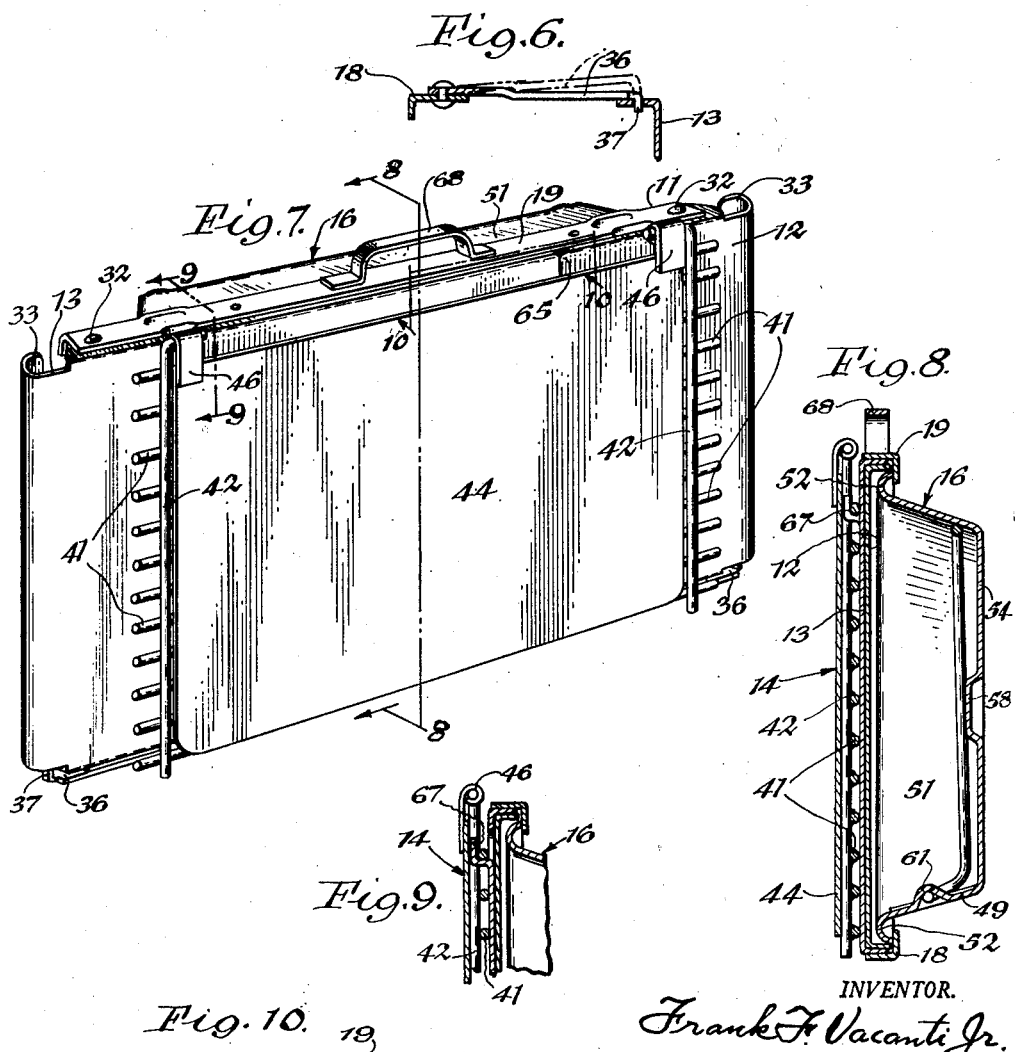

United States Patent Office 2,780,215
Patented Feb. 5, 1957

2,780,215

FOLDING COOKING STOVE

Frank F. Vacanti, Jr., Buffalo, N. Y., assignor to Holland Industries, Inc., Buffalo, N. Y., a corporation of New York Application January 15, 1953, Serial No. 331,392

3 Claims. (Cl. 126—9)

This invention relates to cooking apparatus and is particularly concerned with an adjustable, folding charcoal stove or grill.

An object of the invention is to provide a stove of the character described which is constructed to permit easy erection and folding.

Another object of the invention is to provide a stove of the character described which may be folded compactly with all parts thereof in a single unit.

A further object of the invention is to provide a stove of the character described in which the fire pan is adjustable with respect to the grill to permit regulation of the heat.

Still another object of the invention is to provide a stove of the character described in which the grill can not be accidentally dislodged but may be easily removed for cleaning.

A further object of the invention is to provide a stove of the character described in which there is provided a griddle that may be swung out of the way and will then serve as a wind guard or shield.

Other objects and advantages of the present invention will be apparent from the following specification taken in conjunction with the accompanying drawings in which:

Fig. 1 is a perspective view of the folding stove in operative condition.

Fig. 2 is a vertical transverse section taken on line 2—2, Fig. 1.

Fig. 3 is a vertical longitudinal section taken on line 3—3, Fig. 2.

Fig. 4 is a top plan view with the parts broken away.

Fig. 5 is a fragmentary view similar to Fig. 3 and showing the stove partly folded.

Fig. 6 is a section taken on line 6—6, Fig. 3.

Fig. 7 is a perspective view of the stove fully folded.

Fig. 8 is a vertical section taken on line 8—8, Fig. 7.

Fig. 9 is a fragmentary vertical section taken on line 9—9, Fig. 7.

Fig. 10 is a fragmentary horizontal section taken on line 10—10, Fig. 7.

As best shown in Figure 1 the embodiment of the present invention illustrated comprises a frame 11, a pair of pivotally mounted legs or supports 12 and 13, a removable grill 14, and a fire pan 16.

The frame 11 is formed of a pair of longitudinal parallel angle members or bars 18 and 19. One flange of each member is vertically disposed and the other flanges extend inwardly toward each other and are joined at their corresponding ends by transverse bars 21. The latter are secured by suitable means such as welding or riveting to the longitudinal members 18 and 19 and each bar 21 is provided with a dropped or offset portion 22 which is adapted to receive one end of the grill 14.

The legs 12 and 13 support the frame 11 at its ends. Each of the legs is conveniently formed of a single sheet of metal and comprises a panel 24 having side flanges 26 which, as viewed in Figures 1–3, are bent rearwardly.

There are also provided in each of the panels 24 a plurality of openings 27 which are conveniently formed by punching and bending rearwardly tongues or flanges 28. The aligned tongues on the two panels provide shelves upon which the fire pan 16 may be supported under and parallel to the frame 11.

At their lower ends the legs or supports 12 and 13 have cut away portions 31 and each leg is pivotally attached at the upper end of each of its side flanges 26 to one of the longitudinal members 18 and 19 by suitable means, such as a rivet 32. The pivoted end of each of the panels 24 extends upwardly above the ends of the side flanges 26 thereof and is there bent laterally toward the opposite panel 24 to form an inverted hook or channel 33, substantially semi-circular in cross section, the free end of which extends downwardly substantially to the top of the longitudinal frame members 18 and 19 when the legs are extended at right angles to the frame 11. Adjacent each end of the longitudinal frame member 18 there is provided a brace 36. Each of the braces is pivotally secured at one end to the member 18 and at its other end is provided with a pin or finger 37 that is adapted to enter a hole 38 in one or the other of the legs or supports 12 and 13 when the stove is erected to hold the legs extended in proper position.

The grill 14 is formed from a plurality of spaced, parallel rods 41 which are welded, adjacent the opposite ends thereof, to a pair of transverse rods 42. As mentioned above, the ends of the grill are received in the depressed or offset portions 22 of the transverse bars 21 of the frame 11 and are supported thereby. Dislodgment of the grill is prevented by the curved or hooked, inwardly-extending, upper ends of the panels 24 which prevent it from being removed after the stove is erected. On one side of the grill 14 the ends of the transverse rods 42 are bent inwardly in facing relation to provide mountings for a windshield 44. The latter is a flat, rectangular metal sheet somewhat smaller than the grill 14. Projecting from one side of the windshield 44 adjacent the ends thereof are a pair of hinge elements 46 adapted to be pivotally secured on the inwardly turned ends of the rods 42. Thus the windshield 44 may be swung from the depending, vertical position, best shown in Figure 2, in which it shields the fire pan 16 from wind to a horizontal position resting on the grill 14 where it may be used as a griddle or frying surface.

The fire pan 16, which may be used with charcoal, briquets or even wood, is rectangular in shape and may be formed with a seamless construction by pressing or may, if desired, be formed by cutting and bending from a flat sheet. The side walls 49 and end walls 51 of the pan solpe outwardly toward the top of the pan and are provided, respectively, with outwardly extending flanges or rims 52 and 53. The bottom 54 of the pan 16 is provided with a plurality of holes 56 to permit entry of air for combustion and is strengthened and made rigid to prevent warping by forming therein diagonal, depressed channels or grooves 57 and a raised central portion 58. An inwardly extending loop 61 is provided in one of the longitudinal side walls 49 of the pan 16. A bent wire handle 62 having inwardly turned facing ends 63 is pivotally mounted in the loop by the ends 63 in such manner as to enable it to be turned outwardly for carrying the pan 16 or turned inwardly into the pan when the stove is to be folded up.

When in use the grill 14 is supported on the frame 11 and held in place by the hooked or inwardly turned upper ends 33 of the panels 24 of the legs 12 and 13. The fire pan 16 is supported by the flanges 53 on the end walls thereof on the inwardly turned tongues or shelves 28 formed in the panels 24. As shown in the drawings, three positions are provided for the fire pan but it will be understood that fewer or more may be provided if desired. The pan 16 is of such length as to pass easily between the supports 12 and 13 when the stove is set up and since the tongues or shelves 28 carried by the latter extend inwardly beyond the side flanges 26 of the legs the pan may be moved from one position to another as desired for convenience in cooking.

When it is desired to fold the stove for carrying or storage, the pins or fingers 37 at the ends of the braces 36 are removed from the holes 38 in the legs 12 and 13 and swung outwardly parallel with the longitudinal member 18. The legs may then be swung inwardly sufficiently to permit removal of the grill 14 from the frame 11. The frame and legs are then inverted and the fire pan 16, after folding the handle 62 into the pan, is placed in the frame with its bottom passing through the hole therein so that it is supported by the flanges 52 on the longitudinal walls 49 resting on the longitudinal members 18 and 19 of the frame. The leg 12 which, as shown best in Figure 1, has the lower portion of side flanges 26 thereof inwardly offset as indicated at 65, is then folded down over the fire pan, the tongues or shelves 28 formed therein extending into the pan. This is followed by folding down the leg 13, the offset portions 65 of the legs 12 providing space adjacent the members 18 and 19 for the flanges 26 of the former. The grill 14 is then attached to the stove by inserting the longitudinal rod nearest the pivotal connection of the windshield 44 under the outwardly bent tongues 67, one of which is provided in each of the panels 24 near the edge thereof adjacent the member 19. The grill is thus held in place and at the same time the legs or supports 12 and 13 are locked in folded position. On the outer face of the longitudinal frame member 19 there is provided a handle 68 that permits the stove to be carried conveniently when folded.

From the foregoing description it will be evident that the folding stove of the present invention is very convenient, practical and durable as well as having a construction which permits economical fabrication. In the first place, when folded it requires little space and all of the elements thereof are assembled and carried in a single unit. Further, for example, by forming the stove of sheet metal it is possible to provide the holes or openings 27 in the legs 12 and 13 to allow cooling air to pass over the fire pan to moderate the intensity of the fire while at the same time providing the shelves upon which the fire pan is supported. Thus the construction is simplified and the weight of the stove is maintained at a minimum.

The fire pan 16 itself is rectangular and has a generally flat bottom. Thus it is possible to maintain an even bed of fire under the entire cooking surface and, by suitably positioning the pan, provide the desired degree of heat. The diagonal grooves in the bottom of the fire pan not only strengthen it and prevent warping thereof, but also serve to drain off liquids which may splash or fall therein, since the grooves are in communication with some of the draft holes 56 in the bottom of the pan.

Other novel and convenient features are the grill that is locked in place when the stove is erected but is easily removed for cleaning or when folding the stove and the wind guard that may be used as a griddle by merely swinging it over the grill.

It will be realized that many of the details of construction shown and described may be modified and that the form and shape of certain parts may be changed without departing from the spirit of the invention. Accordingly, it is intended that the invention shall not be considered as limited to such details, but shall be interpreted as broadly as permitted by the appended claims.

I claim:

1. A folding cooking stove, comprising spaced horizontal side bars and spaced horizontal end bars joined at their ends to provide a horizontal rectangular frame with an opening at its center, a pair of generally rectangular sheet metal supporting end panels arranged, when upright, in generally parallel relation to each other, means severally pivotally connecting the upper ends of said supporting panels to the opposite ends of said frame to swing about axes generally parallel with the said end bars of said frame, a rectangular grill resting on said frame and adapted to support the food being cooked, an inverted channel formed as a continuation of the edge of each supporting panel adjacent and generally parallel with the corresponding one of said axes, said inverted channels projecting toward each other and clamping against the top of said grill in the upright position of said supporting panels, a fire pan of slightly shorter length than the space between said supporting panels, and means supporting said fire pan in a horizontal position below said grill with its ends adjacent said supporting panels.

2. A folding cooking stove as set forth in claim 1 wherein said supporting means comprise a series of vertically spaced horizontal flanges struck from the body of each supporting panel toward the other supporting panel to support the opposite ends of said fire pan at different elevations.

3. A folding cooking stove, comprising spaced horizontal side bars and spaced horizontal end bars joined at their ends to provide a horizontal frame with an opening at its center, a pair of generally rectangular sheet metal supporting end panels arranged, when upright, in generally parallel relation to each other, means severally pivoting the upper ends of said frame to swing about axes generally parallel with the said end bars of said frame and permitting said supporting panels to be folded against said frame in face-to-face relation with each other and with said frame, a rectangular grill removably resting on said frame and adapted to support the food being cooked, and a fire pan having a horizontally projecting rim of larger size than said opening and a body of smaller size than said opening whereby the body of said fire pan can be projected through said opening with said rim arranged against said frame and the fire pan can be retained in this position by swinging said supporting panels toward each other into face-to-face relation with each other and with the rim of said fire pan.

References Cited in the file of this patent
UNITED STATES PATENTS

| | | |
|---|---|---|
| 1,250,861 | Hackney | Dec. 18, 1917 |
| 1,463,541 | Andrews | July 31, 1923 |
| 1,723,753 | Vance | Aug. 6, 1929 |
| 2,033,898 | Krebs | Mar. 10, 1936 |
| 2,122,275 | Bitney | June 28, 1938 |
| 2,515,521 | Loffreds | July 18, 1950 |
| 2,530,166 | Johannsen | Nov. 14, 1950 |
| 2,541,528 | McAvoy | Feb. 13, 1951 |
| 2,559,243 | Brown | July 3, 1951 |
| 2,631,579 | Metzger | Mar. 17, 1953 |